Figure 4:
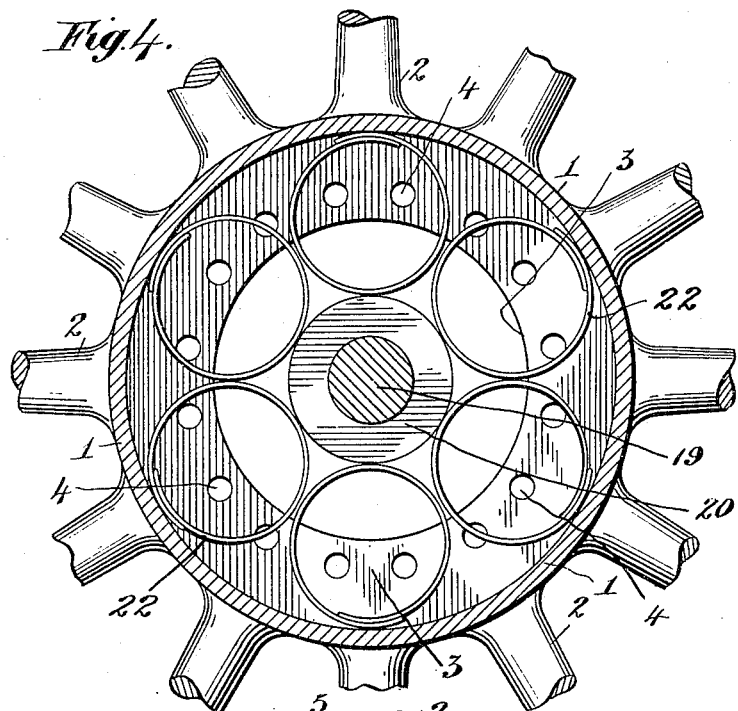

No. 784,397. PATENTED MAR. 7, 1905.
C. R. S. J. HALLÉ.
WHEEL FOR VEHICLES.
APPLICATION FILED JAN. 13, 1904.
5 SHEETS—SHEET 1.
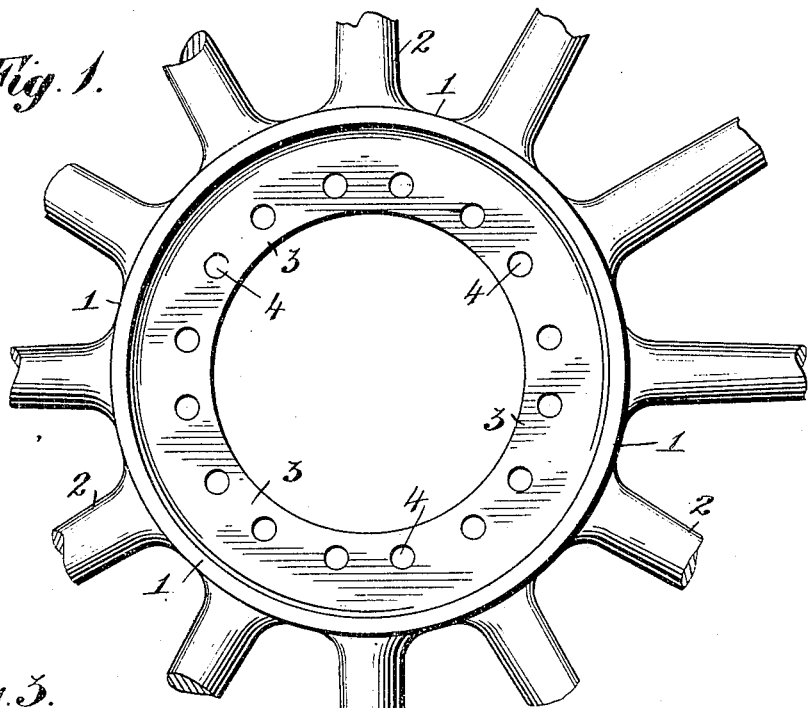
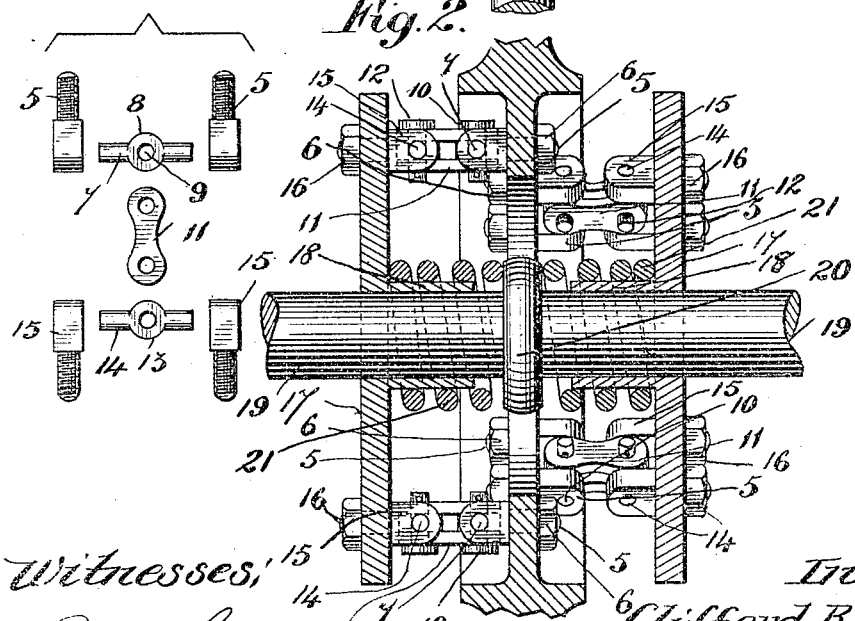
Witnesses:
James L. Norris Jr.
C. J. Kesler
Inventor
Clifford R. S. J. Hallé
By James L. Norris
Atty No. 784,397. PATENTED MAR. 7, 1905.
C. R. S. J. HALLÉ.
WHEEL FOR VEHICLES.
APPLICATION FILED JAN. 13, 1904.

5 SHEETS—SHEET 2.

Witnesses:
James L. Norris, Jr.
C. F. Kesler.

Inventor
Clifford R. S. J. Hallé
By James L. Norris
Atty.

No. 784,397. PATENTED MAR. 7, 190

C. R. S. J. HALLÉ.
WHEEL FOR VEHICLES.
APPLICATION FILED JAN. 13, 1904.

5 SHEETS—SHEET 3.

Witnesses:
James L. Norris
C. F. Kesler

Inventor
Clifford R. S. J. Hallé
By James L. Norris
Atty.

No. 784,397. PATENTED MAR. 7, 1905.
C. R. S. J. HALLÉ.
WHEEL FOR VEHICLES.
APPLICATION FILED JAN. 13, 1904.

5 SHEETS—SHEET 4.

Witnesses:
James L. Norris
C. F. Kesler

Inventor
Clifford R. S. J. Hallé
By James L. Norris
Atty.

No. 784,397. PATENTED MAR. 7, 1905.
C. R. S. J. HALLÉ.
WHEEL FOR VEHICLES.
APPLICATION FILED JAN. 13, 1904.

5 SHEETS—SHEET 5.

Witnesses:
James L. Norris.
C. D. Kesler.

Inventor
Clifford R. S. J. Hallé
By James L. Norris.
Atty.

No. 784,397. Patented March 7, 1905.

UNITED STATES PATENT OFFICE.

CLIFFORD ROBERT STEPHEN JOHN HALLÉ, OF LONDON, ENGLAND.

WHEEL FOR VEHICLES.

SPECIFICATION forming part of Letters Patent No. 784,397, dated March 7, 1905.

Application filed January 13, 1904. Serial No. 188,882.

*To all whom it may concern:*

Be it known that I, CLIFFORD ROBERT STEPHEN JOHN HALLÉ, a subject of the King of Great Britain, residing at 204 Cromwell road, South Kensington, London, England, have invented certain new and useful Improvements in Wheels for Vehicles, of which the following is a specification.

The object of my invention is to provide a cheap and durable wheel for any kind of vehicle which will in itself have spring against shocks and jars.

The great difficulty in spring-wheels hitherto constructed has been to guard against side play in wheels which are partly constructed of springs. In such wheels the usual course has been to place the springs either between the outer and the inner rim of the wheel or around the hub, but always acting in the direction of the plane of the wheel, and in such cases where side play is guarded against this is done by sliding supports, which supports have a tendency to jam when pressure is put on one side of the wheel, and consequently annul the utility of the springs.

My invention entirely does away with the possibility of any side play, while leaving the wheel proper free to spring on the axle, the action of the springs being at right angles to the plane of the wheel, the object being to provide a serviceable spring hub or wheel and to do away with side play and also with the necessity of driving through springs, and, further, relying for my resilience either entirely or principally on springs that have a tension in a lateral direction to the plane of the wheel and not in the plane of the wheel, as is usual.

My invention will be clearly understood from the following description, aided by the accompanying drawings, in which several examples for carrying my invention into effect are shown.

Figure 5:
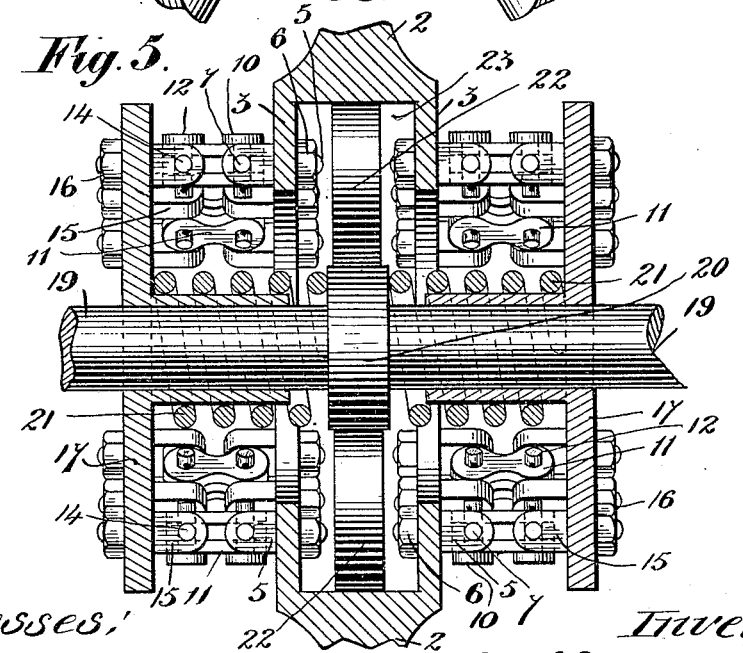
Figure 6:
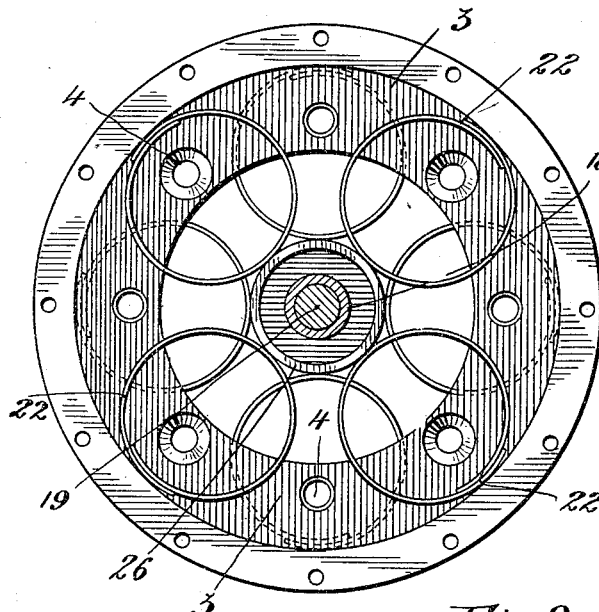
Figure 7:
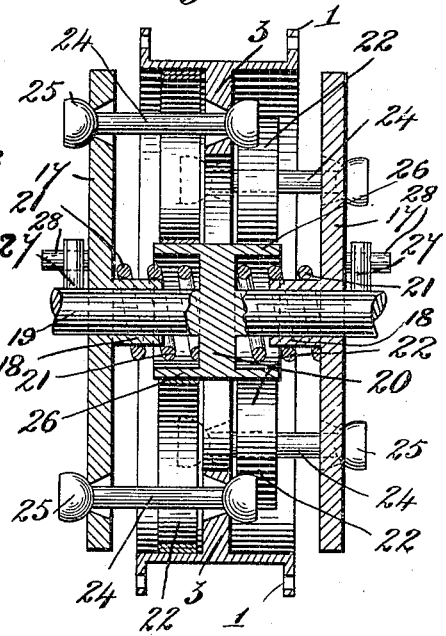
Figure 8:
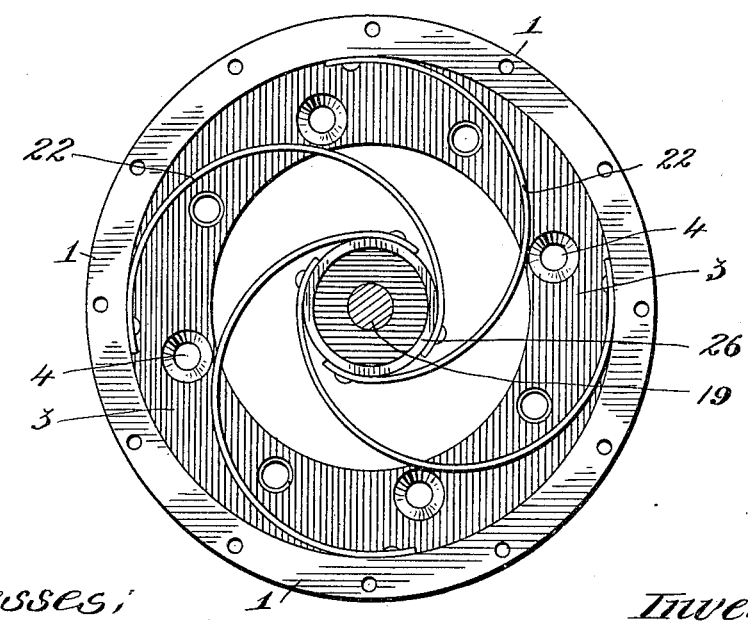
Figure 9:
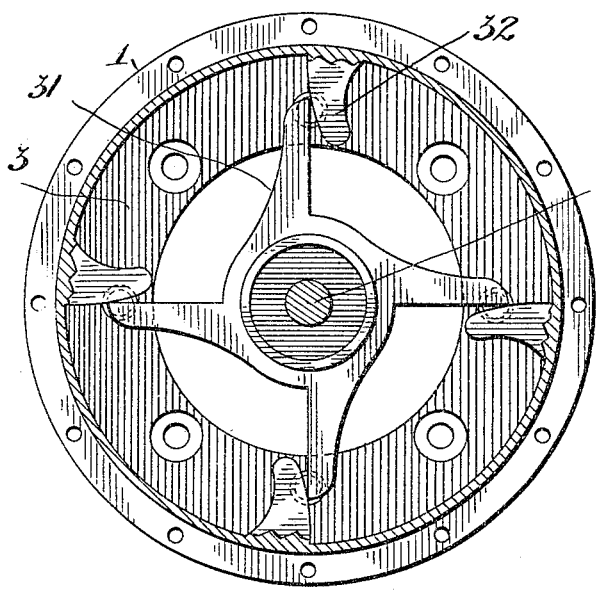
Figure 10:
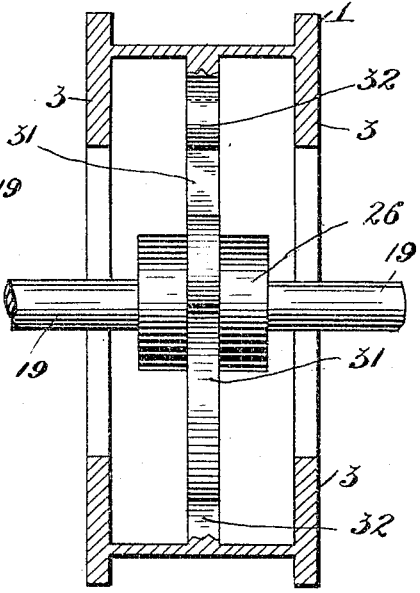
Figure 11:
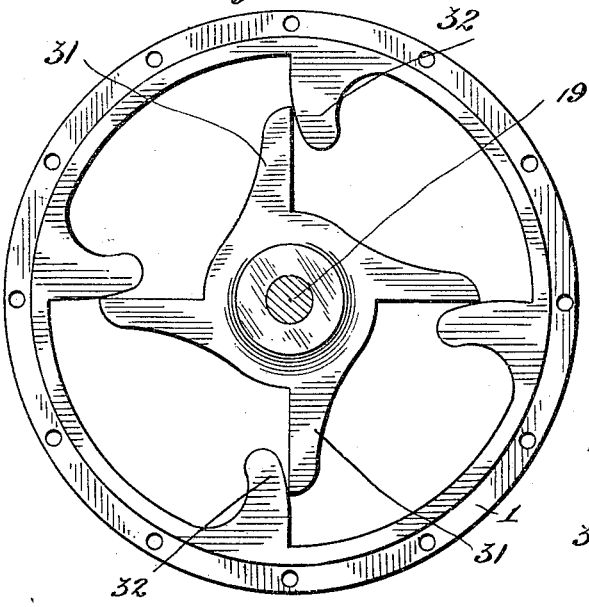
Figure 12:
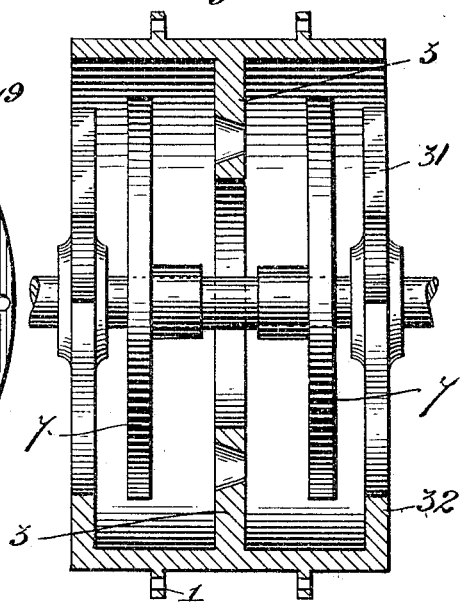
Figure 13:
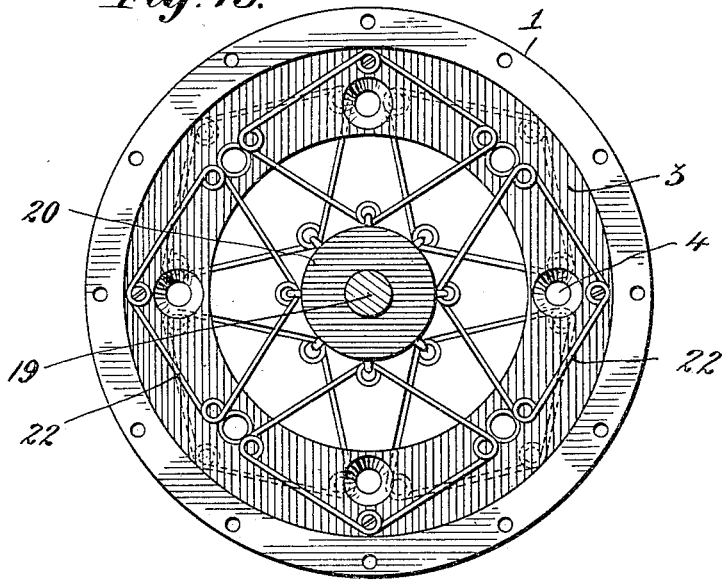
Figure 14:
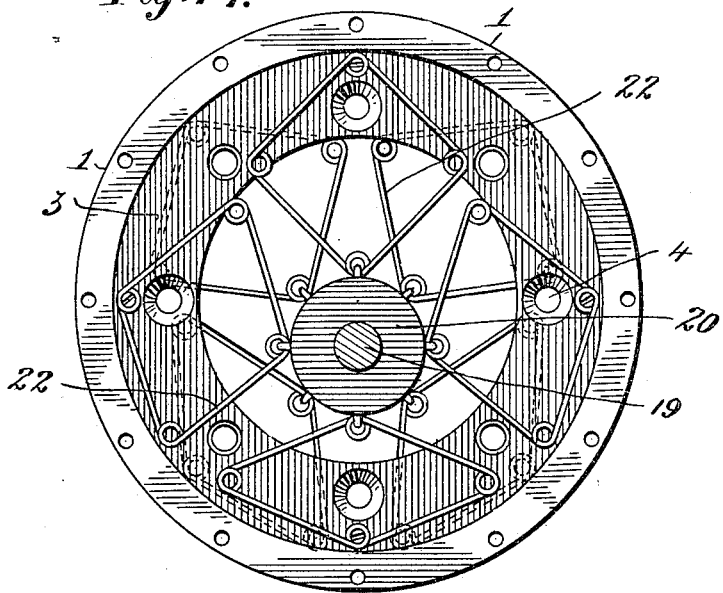

Figure 1 is a side elevation of a wheel-hub. Fig. 2 is a sectional view of hub and its supporting appliances; Fig. 3, a detail view of the links connecting the flange of the hub with the side plates. Fig. 4 is a side elevation of a wheel-hub with auxiliary circular supporting-springs in position. Fig. 5 is a section view of the hub and its supporting appliances. Fig. 6 is a side elevation of a hub, in which two rows of circular auxiliary supporting-springs are arranged. Fig. 7 is a sectional view of a hub and its supporting appliances, the construction being somewhat modified. Fig. 8 is a side elevation of a hub, in which curved auxiliary supporting-springs are arranged. Fig. 9 is a side sectional elevation of a hub, and Fig. 10 a cross-section, in which the engagement of the hub with the axle is by lugs in the hub and a centrally-arranged star-wheel on the axle. Figs. 11 and 12 are similar views to Figs. 9 and 10, but in which two star-wheels are employed for engaging lugs on the inner sides of the hub. Figs. 13 and 14 are elevations of a hub with a modified construction of auxiliary supporting-rings and showing in Fig. 13 their normal position and in Fig. 14 the position when under tension.

According to Figs. 1, 2, and 3 the wheel-hub 1 has radiating from its outer circumference the spokes 2 and from its inner surface a rib 3, such rib being situated mid-distance of the hub 1. This rib is provided with holes 4, in which are fitted on either side studs 5, such studs being secured to the web 3 by nuts 6 or by riveting. These studs 5 work in pairs, and each are provided with a hole, in which engage trunnions 7 of a bearing-piece 8, this being provided with a hole 9 at right angles to the plane of the trunnions for receiving a pin 10, to which are attached links 11, these being connected at the opposite ends by a pin 12 to another similar connecting-piece 13 in the same manner, the trunnions 14 of such connecting-pieces being secured in holes in other studs 15, secured by nuts 16 or otherwise to side plates 17, thus forming a means of connecting the side plates 17 to the hub 1, and at the same time by the peculiar manner of constructing the connections the hub and wheel can have an up-and-down movement during rotation of the wheel and by such action draw the two side plates 17 together or push them apart. The side plates 17 carry inner projecting tubes 18, which tubes surround the axle 19 for sliding thereon, and such axle 19 is provided with a collar 20, situate mid-distance between the side plates 17, and on each side of this collar 20 and between the side plates 17 I arrange strong coiled springs 21, which have action against the collar 20 on each side and force the side plates 17 outward, and thereby centralize the hub and keeping it in its proper alinement on the axle. The flange of the hub terminates at a distance from the axle, so that it can have free play about the same, and the strength of the springs is of a character to suit the weight of vehicle the wheels have to carry; but the construction shown is best adapted for light vehicles, such as cycles and dog-carts.

According to Figs. 4 and 5 the construction is similar to Figs. 2 and 3, except that it is made more adaptable for vehicles which carry heavier weights, such as motor-cars and wagonettes, and for this purpose auxiliary circular springs 22 are employed, these being arranged around the axle 19 and within a box 23, formed between two flanges 3 of the hub, so that these auxiliary springs 22 are all acted upon and help to assist or prevent too great a movement of the springs 21; otherwise the construction is the same as at Figs. 1, 2, and 3.

According to Figs. 6 and 7 the connection between the flange 3 and side plates 17 are by rods 24, having spherical heads 25 for free movement of the hub 1, and the collar 20 is provided with hollow extensions 26 on either side, the auxiliary springs 22 being arranged between these extensions and the hub 1, and to enable the wheel to be driven pins 27 on the axle and pins 28 on the hub are employed; but other means of connecting the side plates to the axle and still allowing of side movement may be employed.

The springs shown in Figs. 6 and 7 are round; but curved springs 22, as shown in Fig. 8, may be substituted, or the springs may be constructed from wire shaped somewhat to a diamond, being curled at the corners, as shown at Figs. 12 and 13, these being secured to the collar 20 at one corner and to the flange 3 at the opposite corner, so as to insure proper spring action on each.

Driving may be accomplished in several manners. In bicycles and light vehicles it will be found that the system shown in Fig. 7 is perfectly practicable. The manner of driving, as shown in Fig. 7, consists of a pair of vertically-extending pins or studs 27, attached to the axle and which are adapted to engage a pair of laterally-extending pins or lugs 28 on the slidable side plates or disks 17, there being a pin or lug 28 for each plate or disk. By this means when the axle revolves the disk is turned with it, and the disk pulls the wheel round by the parallel links.

When it is desired to drive direct from the axle onto the wheel, this is accomplished by a star 31, fixed to the axle. The arms of the star engage with projections 32 on the inside of the hub 3. The star with arms may either be central and the arms merely continuations of the central collar, in which case it will be necessary to employ a double-flanged hub, as shown in Fig. 10, or the driving-stars may be on either side and the projections on which they drive may project laterally and downward outside the hub, as shown in Fig. 12.

It is of course evident that in the case of the wheel where perfect universal joints are used connecting the sliding disks with the hub proper the lateral springs may be dispensed with and resilience obtained entirely from springs in the plane of the wheel, for in this case the solid links and perfect joints will of themselves cause the disks to slide outward and inward as the wheel becomes eccentric to the axle and recovers.

The lateral springs become necessary in practice when tension is relied on against side play. There can be no side play when proper universal joints are used to connect solid links to the hub and disks, as the hub must in this case always remain parallel to the disks.

What I claim, and desire to secure by Letters Patent, is—

1. A spring hub or wheel consisting of a wheel or hub proper connected to two shiftable elements by means of parallel links on either side which have a universal joint at either end, these shiftable elements being capable of sliding on the axle, the shiftable elements holding the hub or wheel proper parallel to themselves by means of the parallel links, whether the hub or wheel is eccentric to the axle or not and a spring element cooperating with each of said shiftable elements.

2. A spring hub or wheel consisting of a wheel or hub connected to two disks or stars by means of parallel links with universal joints the shiftable elements being capable of sliding on the axle and being forced apart by means of powerful springs that work laterally to the plane of the wheel, substantially as described, the lateral stress of the springs affording the vertical resilience of the wheel.

3. A spring hub or wheel consisting of a wheel or hub connected to two shiftable elements that can slide on the axle by means of parallel links with universal joints, the disks being forced apart by powerful springs that work laterally to the plane of the wheel, and which springs are assisted by auxiliary springs acting in the direction of the plane of the wheel substantially as described.

4. A wheel of the character described involving in combination with the hub thereof having the spokes projecting therefrom, a laterally-shiftable element arranged at each side of the hub, said elements shiftable in opposite directions with respect to each other, a cushioning device interposed between said elements, and a universally-jointed connection between each of said elements and said hub.

5. A wheel of the character described involving in combination with the hub thereof having the spokes projecting therefrom, a laterally-shiftable element arranged at each side of the hub, said elements shiftable in opposite directions with respect to each other, an abutment, a spring element interposed between each of said shiftable elements and said abutment, and universally-jointed connections between each of said shiftable elements and said hub.

6. A wheel of the character described involving the combination with the hub thereof having the spokes projecting therefrom and an axle provided with an abutment, of a laterally-shiftable element arranged at each side of the hub and upon said axle, each of said elements provided with inwardly-projecting tubes surrounding the axle, said elements shiftable in opposite directions with respect to each other, cushioning devices bearing against said abutment and said shiftable elements and surrounding said tubes, and universally-jointed connections between each of said elements and said hub.

7. A wheel of the character described involving in combination with the hub thereof having the spokes projecting therefrom, a laterally-shiftable element arranged at each side of the hub, said elements shiftable in opposite directions with respect to each other, a cushioning device interposed between said elements, a universally-jointed connection between each of said elements and said hub, and a driving element for the wheel.

8. A wheel of the character described involving in combination with the hub thereof having the spokes projecting therefrom, a laterally-shiftable element arranged at each side of the hub, said elements shiftable in opposite directions with respect to each other, an abutment, a spring element interposed between each of said shiftable elements and said abutment, universally-jointed connections between each of said shiftable elements and said hub, and a driving element for the wheel.

9. A wheel of the character described involving the combination with the hub thereof having the spokes projecting therefrom and an axle provided with an abutment, of a laterally-shiftable element arranged at each side of the hub and upon said axle, each of said elements provided with inwardly-projecting tubes surrounding the axle, said elements shiftable in opposite directions with respect to each other, cushioning devices bearing against said abutment and said shiftable elements and surrounding said tubes, universally-jointed connections between each of said elements and said hub, and a driving element for the wheel.

10. A wheel of the character described involving the combination with the hub thereof provided with an inwardly-extending rib, a laterally-shiftable element arranged at each side of the hub, said elements shiftable in opposite directions with respect to each other, a spring element interposed between said shiftable elements, and universally-jointed connections between each of said shiftable elements and said rib.

11. A wheel of the character described involving the combination with the hub thereof provided with a rib and an axle provided with an abutment, of a laterally-shiftable element arranged at each side of the hub and mounted upon the axle, said elements shiftable in opposite directions with respect to each other, a spring element interposed between said shiftable element and said abutment, universally-jointed connections between each of said shiftable elements and rib, and a driving element arranged in operative relation with respect to said hub and said axle.

12. A wheel of the character described involving the combination with the hub thereof provided with a rib and an axle having an abutment, of a laterally-shiftable element arranged at each side of the hub and mounted upon the axle, each of said elements provided with an inwardly-extending tube adapted to surround the axle and form a bearing therefor, said elements shiftable in an opposite direction with respect to each other, a spring element interposed between said shiftable element and said abutment, and universally-jointed connections between each of said shiftable elements and said hub.

13. A wheel of the character described involving the combination with the hub provided with a rib and an axle having an abutment, of a laterally-shiftable element arranged at each side of the hub and mounted upon the axle, each of said elements provided with an inwardly-extending tube adapted to surround the axle and form a bearing therefor, said elements shiftable in an opposite direction with respect to each other, a spring element interposed between said shiftable elements and said abutment, universally-jointed connections between each of said shiftable elements and said hub, and driving devices for the wheel arranged in operative relation with respect to the axle and hub.

14. A spring-wheel involving a pair of shiftable elements universally connected with the hub thereof, said hub having the spokes projecting therefrom and a spring element interposed between said shiftable elements.

15. A spring-wheel involving a pair of shiftable elements universally connected with the hub thereof, said hub having the spokes projecting therefrom, a spring element interposed between said shiftable elements, and driving devices for the wheel.

16. A wheel of the character described involving the combination with the hub thereof having the spokes projecting therefrom, of a pair of shiftable elements movable in opposite directions with respect to each other and universally connected with the hub, and a plurality of spring elements interposed between the shiftable elements.

17. A wheel of the character described involving in combination with the hub thereof having the spokes projecting therefrom and loosely mounted upon the axle, and driving devices for the wheel arranged in operative relation with respect to the axle and hub, of a pair of laterally-shiftable elements loosely mounted upon the axle and forming a bearing therefor, said elements shiftable in opposite directions with respect to each other, and a spring element interposed between said shiftable elements.

18. A wheel of the character described involving in combination with the hub thereof loosely mounted upon the axle, and driving devices for the wheel arranged in operative relation with respect to the axle and hub, of a pair of laterally-shiftable elements loosely mounted upon the axle and forming a bearing therefor, said elements shiftable in opposite directions with respect to each other, and a plurality of spring elements interposed between the shiftable elements.

19. A wheel of the character described involving the combination with the hub thereof provided with a rib, of a pair of laterally-shiftable disks, a plurality of links universally connected at one end to said rib and at their other end to said disks, and a spring element interposed between said disks.

20. A wheel of the character described involving the combination with the hub thereof provided with a rib and an axle provided with an abutment, of a pair of laterally-shiftable disks arranged in suitable relation with respect to said hub, said disks provided with inwardly-extending tubes surrounding the axle and forming a bearing therefor, a plurality of links universally connected at one end to said rib and at their other end to said disks, and a pair of spring elements interposed between said abutment and said disks.

21. A wheel of the character described involving the combination with the hub thereof provided with a rib and an axle provided with an abutment, of a pair of laterally-shiftable disks arranged in suitable relation with respect to said hub, said disks provided with inwardly-extending tubes surrounding the axle and forming a bearing therefor, a plurality of links universally connected at one end to said rib and at their other end to said disks, a pair of spring elements interposed between said abutment and said disks, and a plurality of spring elements interposed between said abutment and said hub.

In testimony whereof I have hereunto set my hand in presence of two subscribing witnesses.

CLIFFORD ROBERT STEPHEN JOHN HALLÉ.

Witnesses:
PERCY E. MATTOCKS,
H. MAYKELS.